May 27, 1924.

J. GUÉRY 1,495,841

CHURNING AND BUTTER MALAXATING APPARATUS

Filed March 27, 1923    2 Sheets-Sheet 1

Inventor
Joseph Guéry
by Wilkinson & Giusta
Attorneys

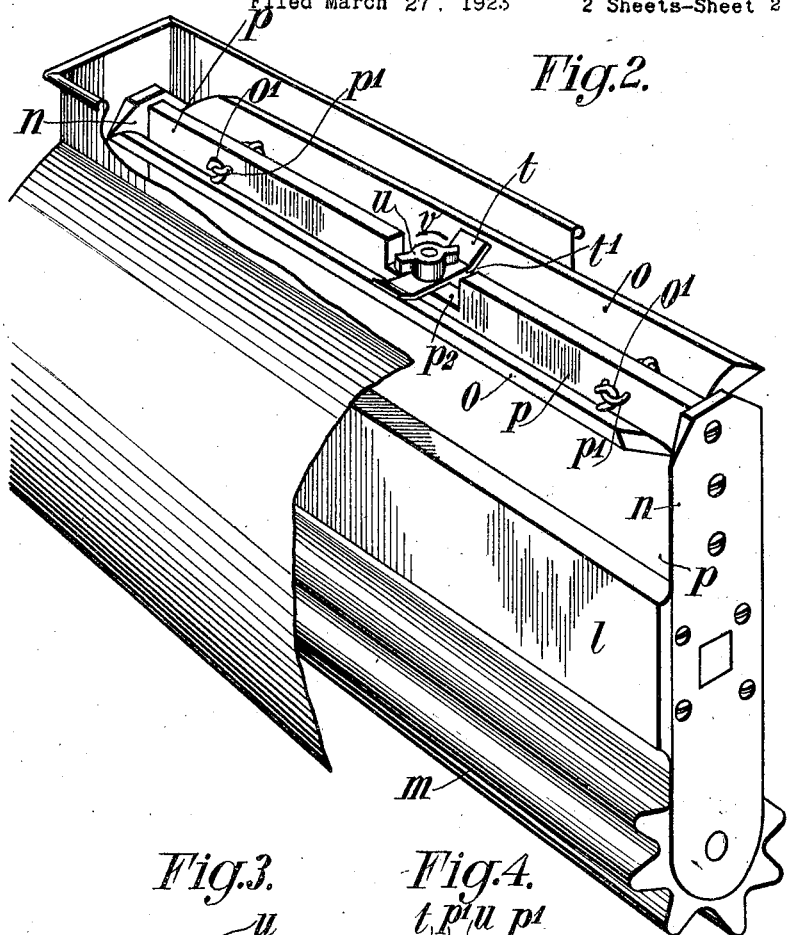
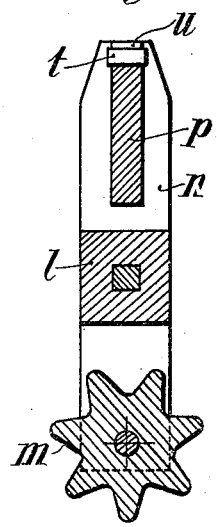
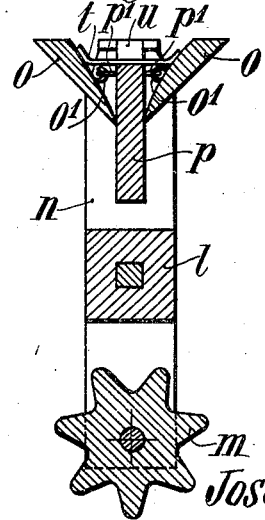

Patented May 27, 1924.

1,495,841

UNITED STATES PATENT OFFICE.

JOSEPH GUÉRY, OF CHATILLON-SUR-SEVRE, FRANCE.

CHURNING AND BUTTER-MALAXATING APPARATUS.

Application filed March 27, 1923. Serial No. 628,062.

*To all whom it may concern:*

Be it known that I, JOSEPH GUÉRY, citizen of the Republic of France, residing at Chatillon-sur-Sevre, Department of Deux Sevres, France, have invented new and useful Improvements in Churning and Butter-Malaxating Apparatus, of which the following is a specification.

The present invention relates to apparatus for beating cream for the purpose of extracting butter therefrom and for washing and malaxating this latter, and it has for its subject a churning and malaxating apparatus of simple construction which permits of manufacturing, washing and malaxating butter in a relatively short time and of subsequently cleaning the apparatus with ease and rapidity.

According to the invention, the device for beating the cream can be transformed, once the butter is formed, by a malaxating or butter-working device for the usual purpose of removing the butter-milk and rendering the butter ready for the market.

According to the invention the beating device is constructed in such a manner that it can be transformed easily and rapidly into a malaxating device, so that it is not necessary to have a separate beater and a separate malaxating device, nor is it necessary to remove the shaft from the churn in order to substitute the one for the other.

The invention is shown by way of example in the accompanying drawings in which:

Fig. 2 is a perspective view of the churn, the body thereof being broken away so as to show more clearly the arrangement of the beating and malaxating device.

Fig. 3 is a transverse section of the beating and malaxating device arranged as a beater.

Fig. 4 is transverse section of the same device provided with blades which permit of its use as a malaxating and scraping device.

Figure 1:
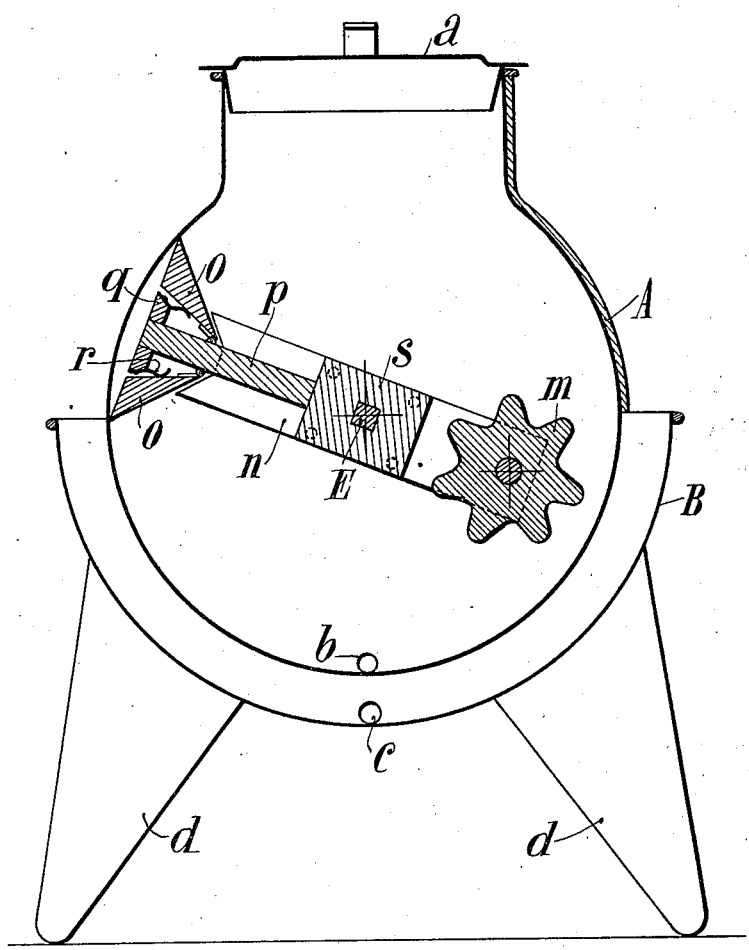
Figure 1 is a vertical transverse section of an apparatus constructed according to the invention.

Referring first of all to Fig. 1 the apparatus comprises a cylindrical vessel A in which the cream to be transformed into butter is introduced; a semi-cylindrical vat B intended to receive a liquid which enables the contents of the vessel A to be heated or cooled according to the temperature of the atmosphere, this vat serves at the same time as a support for the apparatus.

The receptacle or churn proper A is provided with a lid $a$ which is of large dimensions for the purpose of enabling the receptacle to be filled, emptied and cleaned rapidly and of introducing the beater or malaxating device thereinto or withdrawing it therefrom. The receptacle A and the vat B are each provided at their lower portion with an opening which is closed by a plug $b$, $c$ for the purpose of enabling the buttermilk to be withdrawn from the churn or the water from the beating apparatus, respectively. The body of the apparatus comprises the receptacle A and a support B having feet $d$ and is preferably made entirely of metal but the end walls could also be made of wood. These end walls have a central opening in which the shaft E is journalled. The central portion of this latter is square so as to receive the beater or malaxating device which has a corresponding square axial hole. The shaft E also carries a driving crank (not shown).

The malaxating apparatus consists of the malaxating device proper constituted by a grooved roller $m$ the shaft of which is journalled in two arms or standards $n$ fixed upon a central hub $s$ carried by the driving shaft E, and of a scraping device constituted by two movable blades $o$ fixed by means of hinges to a board $p$ extending as far as the hub $s$, this board being fixed to the middle of the two arms $n$. Two tappets $q$ and two small leaf springs $r$ placed on each side of the board $p$ ensure the control of these two scraping members. The scraping device operates by simple pressure upon the butter which it scrapes off and causes to fall down to the bottom of the churn. For this purpose it is sufficient to give the crank half a rotation alternately in one direction or the other, the malaxating roller and the scraping devices then acting alternately. This device also renders it possible to raise the butter up to the opening of the churn thereby facilitating the removal of the butter in a lump, the butter being thus ready for the market.

Washing is effected easily and rapidly. It is sufficient to pour a little hot water into the recipient A and to rotate the crank a few revolutions to clean the churn effectively.

Referring now to the modification shown in Figs. 2 to 4, the malaxating device consists as before of two standards $n$ connected by a hub $l$ between which there is mounted a grooved roller $m$ the shaft of which is journalled in the said standards. The movable blades $o$ are so mounted on the said board that they can easily be removed therefrom. The board does not present any projecting portion and can play the part of a blade and can be utilized as a beater, the grooved roller $m$ which is mounted at the other extremity of the standards $n$, constituting likewise an excellent beating device owing to its being movable about its axis.

The blades $o$ are formed substantially in the same way as those already described and carry, near their extremities and on their inner faces, hooks $o'$ which engage in hooks or staples $p'$ carried by the board $p$ and support the blades $o$ in such a position that they bear against this board by one of their longitudinal edges. In order that these blades may be held in this position during the operation of the apparatus, an abutment device is provided, preferably upon the board $p$. It consists in the example shown, of a double tongue $t$ pivotally mounted in a recess $p^2$ formed in the upper edge of the board and held by a wing-nut $u$ which screws upon its pivot. The extremities of the tongue are turned up as shown so as to follow substantially the form of the inner face of the blades $o$ upon which they bear, thus compelling them to retain their position during the operation of the apparatus. It may be of advantage, in order to still further ensure fixity in position, to provide the double tongue $t$ with two small lugs $t'$, each arranged upon one of its edges on either side of its pivot, the edge of these lugs presenting an oblique surface corresponding to that of the inner face of the blades $o$. These lugs also serve to limit the rotation of the tongue when it is turned to bring it into its position of rest.

In order to use the malaxating device as a beater, it is sufficient to unscrew the nut $u$ sufficiently to liberate the double tongue $t$ and to turn this latter in the direction of the arrow $v$ so that each of its lugs abuts against one of the faces of the board $p$ and the tongue lodges itself longitudinally in the recess $p^2$ so that its extremities do not project at all beyond the faces of the board. The nut $u$ is then tightened up, so as to hold the tongue in the position which it has been given, whereupon the hooks $o'$ are disengaged from the staples $p'$ and the blades $o$ are removed. It is then possible to effect beating by means of the grooved roller $m$ and the board $p$, which latter, in order to give greater efficiency does not extend as far as the hub $l$, as shown in the drawing, and when the beating is finished and it is desired to malaxate the butter and to withdraw it from the churn, it is sufficient to hook the blades $o$ on again and to fix them in position by means of the tongue $t$ as has been described.

It is evident that the arrangements described above could be modified to some extent without altering the principle thereof.

I claim:

1. In a churn and butter malaxating apparatus the combination with a receptacle, of a shaft journalled in the end-walls thereof, the shaft being of square cross-section between said journals, a hub having a square bore adapted to be engaged by the square on said shaft, arms carried by said hub, a board carried by said hub and located between said arms, scraping blades mounted between said arms and said board, and leaf-springs interposed between said blade and said board for pressing said blades against the periphery of the receptacle.

2. In a churn and butter malaxating apparatus the combination, with a receptacle, of a shaft journalled in the end walls of said receptacle, a hub carried by said shaft, arms carried by said hub, a board carried by said arms, scraping blades detachably carried by said board, and means for locking said blades in operative position against the surface of said receptacle.

3. In a churn and butter malaxating apparatus the combination, with a receptacle, of a shaft journalled in the end-walls of said receptacle, a hub carried by said shaft, arms carried by said hub, a board carried by said arms and scraping blades detachably carried by said board, said board having a recess, a tongue mounted in said recess and adapted to engage said blades to hold them in contact with the periphery of said receptacle, and means for releasing said tongue from engagement with said blades to free the latter.

4. In a churn and butter malaxating apparatus the combination with a receptacle, of a shaft journalled in the end-walls of said receptacle, a hub mounted on said shaft, arms carried by said hub, a board carried by said arms on one side of the shaft, said board extending into close proximity to the periphery of said receptacle but leaving the gap between its inner edge and the hub for the purpose set forth.

JOSEPH GUÉRY.